(12) United States Patent
Qu et al.

(10) Patent No.: US 10,876,678 B2
(45) Date of Patent: Dec. 29, 2020

(54) MULTILAYER WIND SPRING FOR A DISPLAY SUPPORT AND LIFTING SUPPORT THEREOF

(71) Applicant: STRONKIN ELECTRONICS CO., LTD, Taizhou (CN)

(72) Inventors: Bo Qu, Taizhou (CN); Xiangyu Xu, Taizhou (CN)

(73) Assignee: STRONKIN ELECTRONICS CO., LTD, Taizhou (CN)

( * ) Notice: Subject to any disclaimer, the term of this patent is extended or adjusted under 35 U.S.C. 154(b) by 0 days.

(21) Appl. No.: 16/086,573

(22) PCT Filed: Sep. 4, 2017

(86) PCT No.: PCT/CN2017/100403
§ 371 (c)(1),
(2) Date: Sep. 19, 2018

(87) PCT Pub. No.: WO2019/006846
PCT Pub. Date: Jan. 10, 2019

(65) Prior Publication Data
US 2020/0232595 A1 Jul. 23, 2020

(30) Foreign Application Priority Data
Jul. 7, 2017 (CN) .......................... 2017 1 0550674

(51) Int. Cl.
*F16M 11/04* (2006.01)
*F16F 1/10* (2006.01)
*F16F 1/12* (2006.01)

(52) U.S. Cl.
CPC ............. *F16M 11/046* (2013.01); *F16F 1/10* (2013.01); *F16F 1/123* (2013.01); *F16F 2224/0208* (2013.01); *F16M 2200/047* (2013.01)

(58) Field of Classification Search
None
See application file for complete search history.

(56) References Cited

U.S. PATENT DOCUMENTS 5,157,825 A * 10/1992 Kasahara .............. F16F 15/073
264/252
6,113,046 A * 9/2000 Wang .................. A47B 21/0314
248/278.1
(Continued)

FOREIGN PATENT DOCUMENTS

| CN | 1575113 A | 2/2005 |
|---|---|---|
| CN | 104390105 A | 3/2015 |
| CN | 206072672 U | 4/2017 |

OTHER PUBLICATIONS

International Search Report and Written Opinion with English translation (PCT/CN2017/100403), dated Sep. 4, 2018, 14 pps.

*Primary Examiner* — Monica E Millner
(74) *Attorney, Agent, or Firm* — The Maxham Firm; Lawrence A. Maxham (57) ABSTRACT

A multilayer wind spring for a display support and a lifting support thereof, the multilayer wind spring is formed by winding a plurality of tightly attached elastic metal sheets, wherein each of the elastic metal sheets comprises a stretching connection portion, a movable sheet portion and an unmovable wound portion, part or all of the elastic metal sheets are provided with a semi-restricted structure which is provided to have a movement allowance in an unwinding or winding direction of the elastic metal sheets, and in an unwinding or winding process of the multilayer wind spring, the stretching connection portion of the elastic metal sheets provided with the semi-restricted structure is arranged to be slidable within a range of the movement allowance relative to a connected component.

13 Claims, 4 Drawing Sheets

(56) References Cited

U.S. PATENT DOCUMENTS

| | | | | |
|---|---|---|---|---|
| 6,997,422 B2* | 2/2006 | Sweere | ............... | F16M 11/105 248/123.11 |
| 7,032,870 B2* | 4/2006 | Sweere | ................. | F16M 11/10 248/295.11 |
| 7,611,103 B2 | 11/2009 | Ha et al. | | |
| 7,764,491 B2* | 7/2010 | Zhao | ..................... | F16M 11/10 361/679.22 |
| 7,789,355 B2 | 9/2010 | Gan et al. | | |
| 7,874,530 B2* | 1/2011 | Kim | .................... | F16M 11/046 248/123.11 |
| 7,876,392 B2* | 1/2011 | Shen | ................... | F16M 11/105 248/146 |
| 10,479,278 B2* | 11/2019 | Du | ........................... | B60R 3/02 |
| 2005/0184215 A1* | 8/2005 | Lin | ......................... | F16F 1/10 248/676 |
| 2007/0045488 A1* | 3/2007 | Shin | ...................... | F16M 11/24 248/176.1 |
| 2007/0205340 A1* | 9/2007 | Jung | ................... | F16M 11/105 248/125.9 |
| 2009/0184224 A1* | 7/2009 | Gan | ...................... | F16M 11/24 248/283.1 |
| 2011/0278424 A1* | 11/2011 | Theis | .................... | F16M 11/18 248/608 |
| 2017/0219158 A1* | 8/2017 | Chin | ..................... | F16M 11/22 |

* cited by examiner

MULTILAYER WIND SPRING FOR A DISPLAY SUPPORT AND LIFTING SUPPORT THEREOF

FIELD OF INVENTION

The present disclosure relates to the technical field of coil springs, and particularly to a multilayer wind spring for a display support and a lifting support thereof.

BACKGROUND OF THE INVENTION

At present, a display screen is usually supported by a lifting support, wherein the lifting support comprises a stand column and a lifting seat, and the display screen is disposed on the stand column via the lifting seat in such a manner that the height of the display screen is adjustable.

A constant force spring (a type of wind spring) is disposed between the stand column and the lifting seat, and with the constant force spring, the display screen can stop arbitrarily during height adjustment.

In order to meet the requirement of ultra-thinning development of the stand column, a person skilled in the art endeavors to replace the existing single-layer constant force spring with a multilayer wind spring, so as to effectively reduce the space occupied by the constant force spring in the stand column, thereby meeting the ultra-thinning requirement of the stand column.

However, the multilayer wind spring has a very short service life, and when in use, there frequently occurs the phenomenon that an inner-layer metal sheet arches, and once the inner-layer metal sheet arches, the multilayer wind spring can no longer be used normally, and has to be replaced, which thereby results in poor user experience, while increasing the maintenance cost.

In the prior art, it is necessary to apply a lubricating oil between two adjacent elastic metal sheets, so as to ensure, to the greatest extent, that no arching occurs within a relatively long time when the multilayer wind spring is in use. The manufacturing process of a multilayer wind spring comprises rolling forming and heat treatment to make elastic metal sheets, and combining the plurality of elastic metal sheets into a multilayer wind spring by means of a spring-making (combining) machine. Since the applied lubricating oil will be washed away during the heat treatment, it must be applied during the spring-combining process. However, as the elastic metal sheets have already been formed by pressing at this moment, the procedure of oil application is complicated with a low efficiency.

SUMMARY OF EMBODIMENTS OF THE INVENTION

An object of the present disclosure is to provide a multilayer wind spring for a display support, so as to solve the technical problem existing in the prior art that the multilayer wind spring has a very short service life, and when in use, there frequently occurs the phenomenon that an inner-layer metal sheet arches, and the problem that a lubricating oil needs to be applied between two adjacent elastic metal sheets, and that the oil application procedure is complicated with low efficiency.

Another object of the present disclosure is to provide a lifting support having the above multilayer wind spring. Compared with the lifting support in the prior art, the lifting support is thinner, and has a longer service life and lower maintenance cost.

In order to solve the above technical problems, the present disclosure provides a multilayer wind spring, which is formed by winding a plurality of tightly attached elastic metal sheets, the elastic metal sheet comprising: a stretching connection portion which is not involved in winding and unwinding and is always kept in an initial state (after the multilayer wind spring is wound up to an extreme position, the stretching connection portion is an outwards-extending portion of the outermost layer or the outermost turn of the wound portion of the elastic metal sheet), a movable sheet portion which is involved in winding and unwinding, and an unmovable wound portion which is not involved in stretching and is always kept in a wound state (the unmovable wound portion is usually wound for not smaller than one turn, and for smaller than one turn in certain situations), the stretching connection portion, the movable sheet portion and the unmovable wound portion are integrally formed and are sequentially arranged in an unwinding direction, n said elastic metal sheets including an $i^{th}$ metal sheet, and the $i^{th}$ metal sheet is the $i^{th}$ of the elastic metal sheets counted from the position of the unmovable wound portion sequentially in a direction from outside to inside, wherein $1 \le i \le n$, the stretching connection portion is provided with a semi-restricted structure used for connection with a connected component, part or all of the elastic metal sheets are provided with the semi-restricted structure, wherein the semi-restricted structure is provided to have a movement allowance in the unwinding or winding up directions of some of or all of the elastic metal sheets; and in an unwinding or winding process of the multilayer wind spring, the stretching connection portion of the elastic metal sheets provided with the semi-restricted structure is arranged to be slidable within the range of the movement allowance relative to the connected component.

When in use, after the stretching connection portion of the multilayer wind spring is connected via a connection structure, the stretching connection portions of some or all of the elastic metal sheets are arranged to be slidable relative to each other in the unwinding or winding up direction.

Further, the multilayer wind spring is formed by winding seven or fewer elastic metal sheets.

Further, the multilayer wind spring is characterized in that the plurality of elastic metal sheets are divided into an outer-layer elastic metal sheet disposed at the outermost side, and inner-layer elastic metal sheets wrapped by the outer-layer elastic metal sheet, wherein the inner-layer elastic metal sheets are provided with the semi-restricted structure, and the stretching connection portion of the outer-layer elastic metal sheet is fixedly connected to the connected component.

Further, the stretching connection portion of the outer-layer elastic metal sheet is fixedly connected to the connected component, and the stretching connection portions of the inner-layer elastic metal sheets are arranged to be slidable within the range of the movement allowance relative to the connected component.

With respect to the winding reel portion (or the unmovable wound portion) of the multilayer wind spring, the outer-layer elastic metal sheet is the outermost elastic metal sheet, and with respect to the stretching connection portion of the multilayer wind spring, the outermost side refers to the side most distant from the unmovable wound portion, when the stretching connection portion is disposed horizontally, the winding reel portion (or the unmovable wound portion) is at a higher position, and the outer-layer elastic metal sheet refers to the elastic metal sheet disposed at the lowest position.

Further, a fastening connector for connecting the stretching connection portion to the connected component is inserted into the semi-restricted structure, and fastening connector and the semi-restricted structure are provided to have the movement allowance therebetween.

In the above, the fastening connector does not completely press and lock the stretching connection portion, and the stretching connection portion is arranged to be slidable relative to the fastening connector.

Further, the semi-restricted structure is an elongated hole, an elongated groove or a round hole, and the elongated hole or the elongated groove is arranged such that the length direction thereof is along the unwinding or winding up direction of the elastic metal sheet. The fastening connector is selected from the group consisting of screw, bolt, pin, hook, rivet, and the like.

Further, the movement allowance is 0.3-15 mm, more preferably 0.6-2 mm.

That is, the length of the elongated hole or the elongated groove is 0.3-15 mm larger than the outer diameter of the fastening connector, and when the semi-restricted structure is a connection hole, the hole diameter of the connection hole is 0.3-15 mm larger than the outer diameter of the fastening connector.

In the above, the elongated hole or the elongated groove is used for disposing the stretching connection portion of the multilayer wind spring on the stand column or the lilting seat of the lifting support.

Preferably, the elongated hole is an obround kidney-shaped hole. When a certain elastic metal sheet tends to arch due to a displacement during use, the stretching connection portion of the elastic metal sheet freely stretches and retracts within the range of the movement allowance via the semi-restricted structure such as an elongated hole or an elongated groove, so as to eliminate the stress causing the elastic metal sheet to arch, and prevent the elastic metal sheet from arching, thereby further ensuring the service life of the multilayer wind spring.

Further, the end of the stretching connection portion of the elastic metal sheet is bent towards the opposite side of the unmovable wound portion to form a hook used as the connection structure, and the hook is hooked onto the connected component, the hook of the inner-layer elastic metal sheet can move unidirectionally in the stretching direction away from the unmovable wound portion.

Further, the thickness of the $j^{th}$ of the elastic metal sheets is h, and after the movable sheet portion is wholly wound up and wound around the outer side of the unmovable wound portion, the movable sheet portion is wound for m turns, and the movement allowance of the $j^{th}$ metal sheet is $2\pi$ mh±3 mm, wherein $h>0, m>0, 2 \leq j \leq n$.

In the winding and unwinding processes, the elastic metal sheet at a different turn displaces or arches at a different degree, in order to ensure that each elastic metal sheet can be unwound to eliminate all the stresses causing the arching, it needs to be met that the movement allowance is $2\pi$ mh±3 mm, that is, after a fastener such as a screw runs through the semi-restricted structure such as an elongated hole or an elongated groove, the semi-restricted structure at least retains an movement allowance of $2\pi$ mh±3 mm.

Further, no lubricating oil is applied between two adjacent elastic metal sheets.

In the prior art, it is necessary to apply a lubricating oil between two adjacent elastic metal sheets, so as to ensure, to the greatest extent, that no arching occurs within a relatively long time when the multilayer wind spring is in use. The manufacturing process of multilayer wind spring comprises making elastic metal sheets by rolling forming and heat treatment, and combining the plurality of elastic metal sheets into a multilayer wind spring by means of a spring-making machine. Since the applied lubricating oil will be washed away during the heat treatment, it must be applied during the spring-combining process, however, as the elastic metal sheets have already been formed by pressing at this moment, the procedure of oil application is complicated with a low efficiency.

With the above arrangement, the present disclosure effectively prevents the phenomenon of arching, and therefore it is possible that no lubricating oil is applied between the elastic metal sheets. Accordingly, the plurality of elastic metal sheets can be stacked and simultaneously subjected to rolling modeling and heat treatment, which no longer requires the spring-combining procedure while omitting the complicated oil application procedure, thereby greatly improving the production efficiency.

Further, the elastic metal sheets are metal sheets having uniform thickness and consistent width that are used for making constant force springs.

Further, the unmovable wound portion is wound for not less than three turns.

The maximum rated stroke is the extreme unwinding length of the wind spring during normal use, and when the extreme unwinding length is exceeded, the wind spring will be easily damaged or cannot meet the normal use requirement.

By lengthening of the unmovable wound portion, even when the stretching connection portion is stretched to reach the extreme unwinding length, the present disclosure can still ensure that the unmovable wound portion is wound for not less than three turns, preferably for not less than five turns, and the elastic metal sheets of the corresponding portion of the unmovable wound portion with multiple turns rub against each other to produce sufficient resistance force so as to prevent the displacement between the elastic metal sheets.

Further, the unmovable wound portions of the plurality of elastic metal sheets are fixedly connected relative to one another.

Further, the multilayer wind spring is formed by together winding 2-5 tightly attached elastic metal sheets.

Further, all the elastic metal sheets of the unmovable wound portion are arranged to be fixed to one another.

Further, the elastic metal sheets of the unmovable wound portion are fixedly connected by a rivet, a screw, a buckle, a pin, a mortise-tenon structure, bundling, welding, or bonding.

By employing the above the technical solutions, the present disclosure has the following advantageous effects:

The multilayer wind spring provided by the present disclosure has a simple structure and provides stronger supporting force, and the present disclosure occupies smaller space while providing the same supporting force, and can effectively prevent dislocation between multiple elastic metal sheets of the winding reel portion of the wind spring, thereby effectively eliminating the arching phenomenon of the wind spring, and thereby greatly prolonging the service life of the multilayer wind spring, which makes it possible to popularize and apply the multilayer wind spring.

In addition, the present disclosure further provides a lifting support having the above multilayer wind spring, which comprises a stand column and a lifting seat.

The lifting seat is disposed on the stand column in such a manner that it is slidable up and down.

The stretching connection portion of the multilayer wind spring is connected to the lifting seat or the stand column.

The stretching connection portion of the elastic metal sheet provided with the semi-restricted structure is arranged to be slidable within the range of the movement allowance relative to the lifting seat or the stand column.

The unmovable wound portion of the multilayer wind spring is rotatably disposed on the stand column or the lifting seat.

The multilayer wind spring tends to force the lifting seat to move upwards, thereby providing a supporting force for supporting the lifting seat.

Further, the lifting support is a display screen support, and a display screen is disposed on the lifting seat.

Further, the unmovable wound portion of the multilayer wind spring is rotatably disposed on the stand column or the lifting seat via a rotation shaft or a semi-wrapped spring seat for constant force spring.

According to the lifting support disclosed by the present disclosure, by using a multilayer wind spring, the number of wind springs arranged is greatly reduced, while the supporting force is kept unchanged, and therefore the sliding chute space used for accommodating the wind springs is effectively reduced, since the sliding chute space is usually arranged inside the stand column, in the case where the requirement for the sliding chute space is reduced, it is possible to achieve a thinner stand column, or a higher supporting strength provided by the stand column.

BRIEF DESCRIPTION OF THE DRAWING

In order to more clearly illustrate the technical solutions in the embodiments of the present disclosure or in the prior art, brief description is made below on the drawings required to be used in the description of the embodiments or the prior art. Obviously, the following drawings only illustrate some of the embodiments of the present disclosure, and for a person of ordinary skills in the art, other drawings may be obtained from these drawings without using inventive effort.

REFERENCE SIGNS

1—fastening connector, 10—elastic metal sheet, 11—stretching connection portion, 12—movable sheet portion, 13—unmovable wound portion, 14—semi-restricted structure, 15—round connection hole, 101—outer-layer elastic metal sheet, 102—inner-layer elastic metal sheet, 8—movement allowance, 16—hook, 2—stand column, and 3—lifting seat.

DETAILED DESCRIPTION OF THE PREFERRED EMBODIMENTS

The technical solutions of the present disclosure will be clearly and completely described below with reference to the drawings. Obviously, the embodiments described are only some of the embodiments of the present disclosure, rather than all of the embodiments of the present disclosure. All the other embodiments that are obtained by those of ordinary skills in the art on the basis of the embodiments of the present disclosure without inventive effort shall be covered by the protection scope of the present disclosure.

In the description of the present disclosure, it is to be understood that the orientational or positional relation denoted by the terms such as "center," "upper." "lower," "left," "right." "vertical," "horizontal," "inner," and "outer" is based on the orientation or position relation indicated by the figures, which only serves to facilitate describing the present disclosure and simplify the description, rather than indicating or implying that the device or element referred to must have a particular orientation, and is constructed and operated in a particular orientation, and therefore cannot be construed as a limitation on the present disclosure. In addition, the terms such as "first," "second," and "third" are only used for the purpose of description and cannot be understood as an indication or implication of relative importance.

In the description of the present disclosure, it should be noted that unless otherwise explicitly specified and defined, the terms "install," "connect with," and "connect" shall be understood in broad sense, which may, for example, refer to fixed connection, detachable connection or integral connection, may refer to mechanical connection or electrical connection, may refer to direct connection or indirect connection by means of an intermediate medium, and may refer to communication between two elements. Those of ordinary skills in the art could understand the specific meanings of the terms in the present disclosure according to specific situations.

Below, the present disclosure is further described in detail in connection with embodiments.

Figure 1:
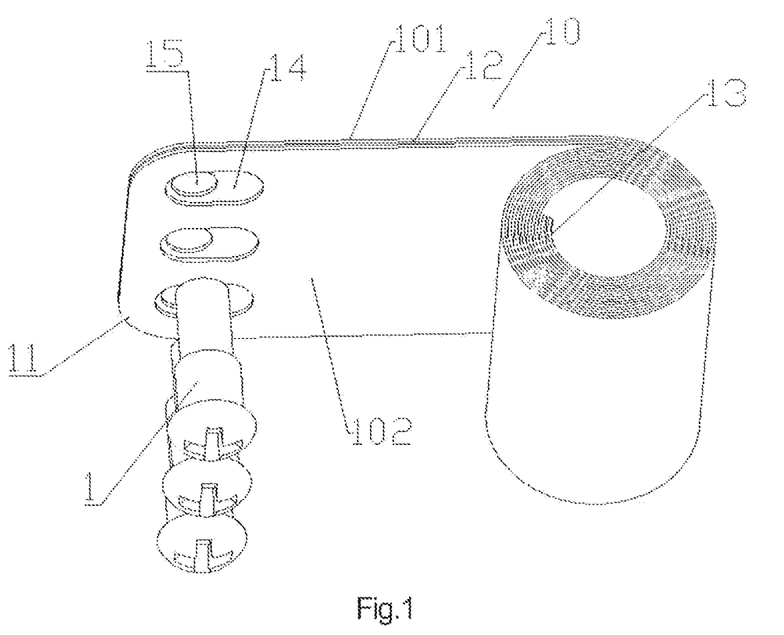
FIG. 1 is a schematic structural diagram of a multilayer wind spring provided by examples of the present disclosure.

As shown in FIG. 1, the present example provides a multilayer wind spring, the multilayer wind spring is formed by winding n tightly attached elastic metal sheets 10, wherein n is a natural number greater than or equal to 2.

Figure 2:
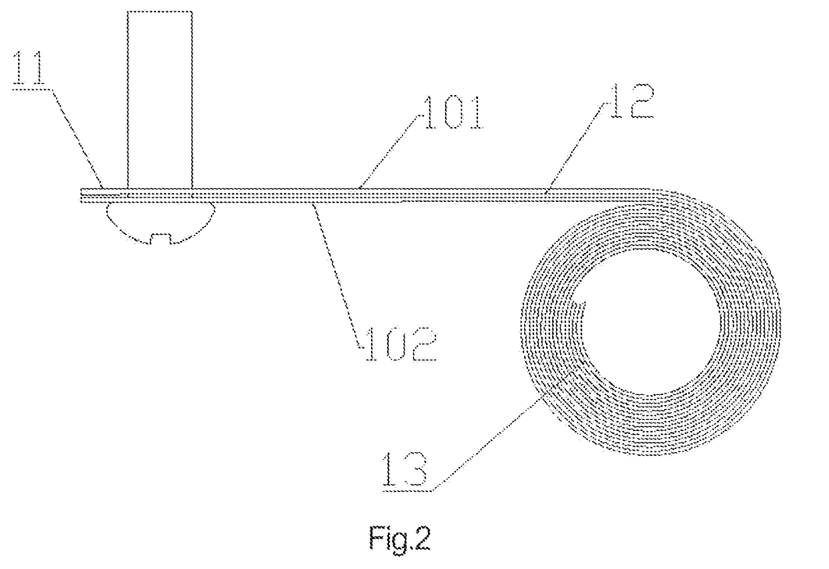
FIG. 2 is a front view of a multilayer wind spring provided by examples of the present disclosure.

Each elastic metal sheet 10 comprises: a stretching connection portion 11 which is not involved in winding and unwinding and is always kept in an initial state (after the multilayer wind spring is wound up to an extreme position, the stretching connection portion 11 is the outwards-extending portion of the outermost layer or the outermost turn of the wound portion of the elastic metal sheet 10), a movable sheet portion 12 which is involved in winding and unwinding, and an unmovable wound portion 13 which is not involved in stretching and is always kept in a wound state (the unmovable wound portion 13 is usually wound for not smaller than one turn, and for smaller than one turn in certain situations), the stretching connection portion 11, the movable sheet portion 12, and the unmovable wound portion 13 are sequentially arranged in an unwinding direction, n elastic metal sheets 10 includes an $i^{th}$ metal sheet, and the $i^{th}$ metal sheet is the $i^{th}$ of the elastic metal sheets 10 counted from the position of the unmovable wound portion 13 sequentially in a direction from outside to inside, wherein 1≤i≤n, wherein in the present example, as shown in FIG. 2, the multilayer wind spring is formed by tightly attaching and winding an outer-layer elastic metal sheet 101 and inner-layer elastic metal sheets 102, and in the same way, three-layered, four-layered and even five-layered wind springs can be made.

The stretching connection portion 11 is provided with a connection structure used for connection with a connected component.

Figure 3:
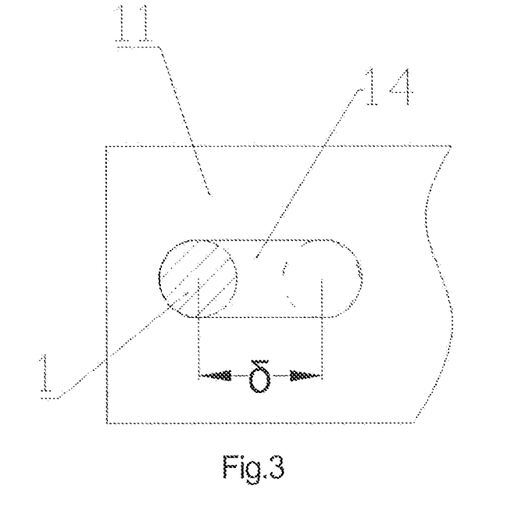
FIG. 3 is a schematic structural diagram of a semi-restricted structure in examples of the present disclosure.

The connection structure on some or all of the elastic metal sheets 10 is a semi-restricted structure 14, wherein as shown in FIG. 3, the semi-restricted structure 14 is provided to have a movement allowance δ in an unwinding or winding up direction of the elastic metal sheets 10. In an unwinding or winding process of the multilayer wind spring, the stretching connection portion 11 of the elastic metal sheets 10 provided with the semi-restricted structure 14 is arranged to be slidable within the range of the movement allowance δ relative to the connected component.

When in use, after the stretching connection portion 11 of the multilayer wind spring is connected via the connection structure, the stretching connection portions 11 of some or all of the elastic metal sheets 10 are arranged to be slidable relative to each other in the unwinding or winding up direction.

The above-mentioned n is a natural number not greater than 7.

The number of elastic metal sheets 10 provided with the semi-restricted structure 14 is preferably any one of 1 to n−1. That is, the connection structure in the case where there is only one elastic metal sheet 10 is not a semi-restricted structure 14, and the stretching connection portion of the elastic metal sheet is fixedly connected to the connected component.

Specifically, the connection structure of the stretching connection portion 11 of the outer-layer elastic metal sheet 101 at the outermost layer is a round connection hole 15, the stretching connection portion 11 of the outer-layer elastic metal sheet 101 is fixedly connected to the connected component, and the connection structure of the inner-layer elastic metal sheet 102 is a semi-restricted structure 14, when the multilayer wind spring is of an n-layered structure, the connection structures of the stretching connection portions 11 of from the $2^{nd}$ metal sheet to the $n^{th}$ metal sheet are semi-restricted structures 14, that is, the stretching connection portions 11 of from the $2^{nd}$ metal sheet to the $n^{th}$ metal sheet are arranged to be slidable within the range of the movement allowance δ relative to the connected component.

With respect to the winding reel portion (or the unmovable wound portion 13) of the multilayer wind spring, the outer-layer elastic metal sheet refers to the outermost elastic metal sheet 10, and with respect to the stretching connection portion 11 of the multilayer wind spring, the outermost side is the side most distant from the unmovable wound portion 13, when the stretching connection portion 11 is disposed horizontally, the winding reel portion (or the unmovable wound portion 13) is at a higher position, and the outer-layer elastic metal sheet refers to the elastic metal sheet 10 disposed at the lowest position.

As shown in FIG. 3, the semi-restricted structure 14 is an elongated hole (a kidney-shaped hole or an obround hole) or an elongated groove, and the elongated hole or the elongated groove is arranged in the unwinding or winding up direction of the elastic metal sheet 10. A fastening connector 1 such as a screw, a bolt or a rivet is inserted into the elongated hole or the elongated groove for connecting the stretching connection portion 11 to the connected component, and after the fastening connector 1 is inserted into the elongated hole or the elongated groove, a gap which serves as the movement allowance δ is formed between the fastening connector 1 and the elongated hole or the elongated groove. In the above, the fastening connector does not completely press and lock the stretching connection portion, and the stretching connection portion is arranged to be slidable relative to the fastening connector.

Figure 4:
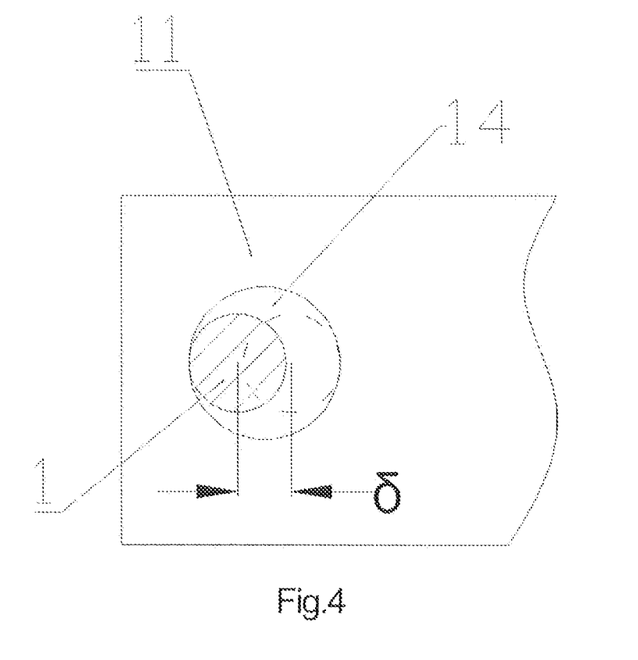
FIG. 4 is a schematic diagram of another embodiment of a semi-restricted structure in examples of the present disclosure.

As shown in FIG. 4, the semi-restricted structure 14 is a round connection hole, and the fastening connector 1 such as a screw, a bolt, or a rivet is inserted into the connection hole for connecting the stretching connection portion 11 to the connected component. After the fastening connector 1 is inserted into the connection hole, the hole diameter of the connection hole is larger than the outer diameter of the fastening connector 1, and therefore a gap which serves as the movement allowance δ is formed between the fastening connector 1 and the round connection hole. The movement allowance δ is the difference between the hole diameter of the connection hole and the outer diameter of the fastening connector. The fastening connector does not completely press and lock the stretching connection portion, and the stretching connection portion is arranged to be slidable relative to the fastening connector.

In the above, the movement allowance h is 0.3-15 mm, more preferably 0.6-2 mm.

That is, the length of the elongated hole or the elongated groove is 0.5-5 mm larger than the outer diameter of the fastening connector 1, and when the semi-restricted structure 14 is a connection hole, the hole diameter of the connection hole is 0.5-5 mm larger than the outer diameter of the fastening connector 1.

Figure 6:
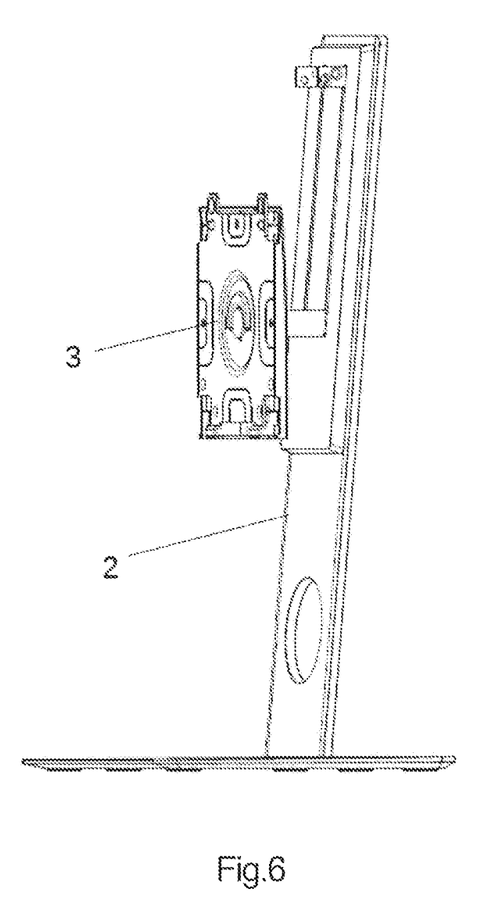
FIG. 6 is a schematic structural diagram of a lifting support having a multilayer wind spring according to the present disclosure.

In the above, the elongated hole or the elongated groove is used for disposing the stretching connection portion 11 of the multilayer wind spring on the stand column 2 or the lifting seat 3 of the lifting support.

Preferably, the elongated hole is an obround kidney-shaped hole. When a certain elastic metal sheet 10 tends to arch due to displacement during use, the stretching connection portion 11 of the elastic metal sheet 10 freely stretches and retracts within the range of the movement allowance δ via the semi-restricted structure 14 such as an elongated hole or an elongated groove, so as to eliminate the stress causing the elastic metal sheet 10 to arch, and prevent the elastic metal sheet 10 from arching, thereby further ensuring the service life of the multilayer wind spring.

Figure 5:
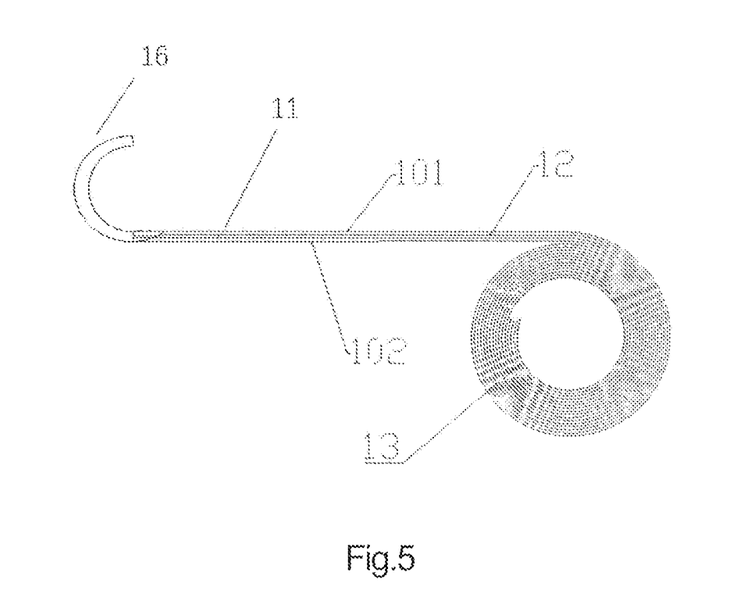
FIG. 5 is a schematic structural diagram in which the semi-restricted structure is a hook in an example of the present disclosure.

Another embodiment of the semi-restricted structure is as follows: the end of the stretching connection portions 11 of n elastic metal sheets 10 are bent towards the opposite side of the unmovable wound portion 13 to form a hook 16 used as the connection structure, the hook 16 and the unmovable wound portion 13 are in an S shape, and the hook 16 is hooked onto the connected component, and the hook 16 of the inner-layer elastic metal sheet can move unidirectionally in the stretching direction away from the unmovable wound portion 13.

The movement allowance δ is calculated as follows:

The thickness of the $j^{th}$ metal sheet is h, and after the movable sheet portion 12 is wholly wound up and wound around the outer side of the unmovable wound portion 13, the movable sheet portion 12 is wound for m turns, and the movement allowance δ of the $j^{th}$ metal sheet is 2π mh±0.3 mm, wherein $h>0, m>0, 2 \leq j \leq n$.

In the winding and unwinding processes, the elastic metal sheet 10 at a different turn displaces or arches at a different degree, in order to ensure that each elastic metal sheet 10 can be fully unwound to eliminate all the arching-causing stresses, it needs to be met that the movement allowance δ is 2π mh±0.3 mm, that is, after a fastener such as a screw runs through the semi-restricted structure 14 such as an elongated hole or an elongated groove, the semi-restricted structure 14 at least retains an movement allowance δ of 2π mh±0.3 mm.

No lubricating oil is applied between two adjacent elastic metal sheets 10.

In the prior art, it is necessary to apply a lubricating oil between two adjacent elastic metal sheets 10, so as to ensure, to the greatest extent, that no arching occurs within a relatively long time when the multilayer wind spring is in use. The manufacturing process of a multilayer wind spring comprises making elastic metal sheets 10 by rolling forming and heat treatment, and combining the plurality of elastic metal sheets 10 into a multilayer wind spring by means of a spring-making machine. Since the applied lubricating oil will be washed away during the heat treatment, it must be applied during the spring-combining process, however, as the elastic metal sheets 10 have already been formed by pressing at this moment, the procedure of oil application will be complicated with low efficiency.

With the above arrangement, the present disclosure effectively prevents the phenomenon of arching, and therefore it is possible that no lubricating oil is applied between the elastic metal sheets 10. Accordingly, the plurality of elastic metal sheets 10 can be stacked and simultaneously subjected to rolling forming and heat treatment, which no longer requires the spring-combining procedure while omitting the complicated oil application procedure, thereby greatly improving the production efficiency.

In the above, the elastic metal sheets 10 are metal sheets having uniform thickness and consistent width that are used for making constant force springs.

In addition, the unmovable wound portion 13 is wound for not less than three turns. The maximum rated stroke is the extreme unwinding length of the wind spring during normal use, and when the extreme unwinding length is exceeded, the wind spring will be easily damaged or unable to meet the normal use requirement.

By lengthening of the unmovable wound portion 13, even when the stretching connection portion 11 is stretched to reach the extreme unwinding length, the present disclosure can still ensure that the unmovable wound portion 13 is wound for not less than three turns, preferably for not less than five turns, and the elastic metal sheets 10 of the corresponding portion of the unmovable wound portion 13 with multiple turns rub against each other to produce sufficient resistance force so as to prevent the displacement between the elastic metal sheets 10.

More preferably, the unmovable wound portions 13 of n elastic metal sheets 10 are fixedly connected relative to one another. The multilayer wind spring is formed by together winding 2-5 tightly attached elastic metal sheets 10.

The multilayer wind spring provided by the present disclosure has a simple structure and provides stronger supporting force, and the present disclosure occupies smaller space while providing the same supporting force, and can effectively prevent dislocation between multiple elastic metal sheets 10 of the winding reel portion of the wind spring, thereby effectively eliminating the arching phenomenon of the wind spring, and further greatly prolonging the service life of the multilayer wind spring, which makes it possible to popularize and apply the multilayer wind spring.

In addition, the present disclosure further discloses a lifting support having the above multilayer wind spring, which comprises a stand column 2 and a lifting seat 3, wherein the lifting seat 3 is disposed on the stand column 2 in such a manner that it is slidable up and down, the stretching connection portion 11 of the multilayer wind spring is connected to the lifting seat 3 or the stand column, the stretching connection portion 11 of the elastic metal sheet 10 provided with the semi-restricted structure 14 is arranged to be slidable within the range of the movement allowance δ relative to the lifting seat 3 or the stand column 2, the unmovable wound portion 13 of the multilayer wind spring is rotatably disposed on the stand column 2 or the lifting seat, and the multilayer wind spring tends to force the lifting seat 3 to move upwards, thereby providing a supporting force for supporting the lifting seat 3.

The lifting support is a display screen support, and a display screen is disposed on the lifting seat 3.

The unmovable wound portion 13 of the multilayer wind spring is rotatably disposed on the stand column 2 or the lifting seat 3 via a rotation shaft or a semi-wrapped spring seat for constant force spring.

According to the lifting support disclosed by the present disclosure, by using a multilayer wind spring, the number of wind springs arranged is greatly reduced, while the supporting force is kept unchanged, and therefore the sliding chute space used for accommodating the wind springs is effectively reduced, since the sliding chute space is usually arranged inside the stand column 2, in the case where the requirement for the sliding chute space is reduced, it is possible to achieve a thinner stand column 2, or a higher supporting strength provided by the stand column 2.

Finally, it should be noted that the above embodiments are only used to illustrate the technical solutions of the present disclosure, rather than limit the same. Although the present disclosure has been described in detail in connection with the above embodiments, it should be understood by those of ordinary skills in the art that the technical solutions described in the embodiments can still be modified, or equivalent substitution can be made to some or all of the technical features therein. And the modification or substitution would not cause the substance of the corresponding technical solutions to depart from the scope of the technical solutions of the embodiments of the present disclosure.

What is claimed is:

1. A multilayer wind spring for a display support, formed by winding elastic metal sheets, wherein the elastic metal sheets are in a number of two or more and are tightly attached, wherein each of the elastic metal sheets comprises: a stretching connection portion which is not involved in winding and unwinding and is always kept in an initial state, a movable sheet portion which is involved in winding and unwinding, and an unmovable wound portion which is not involved in stretching and is always kept in a wound state, the stretching connection portion, the movable sheet portion and the unmovable wound portion are integrally formed and sequentially arranged in an unwinding direction, the stretching connection portion is provided with a semi-restricted structure used for connection with a connected component, part or all of the elastic metal sheets are provided with the semi-restricted structure, the semi-restricted structure is provided to have a movement allowance in an unwinding or winding up direction of some or all of the elastic metal sheets, and in an unwinding or winding process of the multilayer wind spring, the stretching connection portion of the elastic metal sheets provided with the semi-restricted structure is arranged to be slidable within a range of a movement allowance relative to the connected component.

2. The multilayer wind spring for a display support according to claim 1, being formed by winding seven or fewer elastic metal sheets.

3. The multilayer wind spring for a display support according to claim 1, wherein a plurality of the elastic metal sheets are divided into an outer-layer elastic metal sheet disposed at an outermost side, and inner-layer elastic metal sheet wrapped by the outer-layer elastic metal sheet, the inner-layer elastic metal sheet is provided with the semi-restricted structure, and the stretching connection portion of the outer-layer elastic metal sheet is fixedly connected to the connected component.

4. The multilayer wind spring for a display support according to claim 3, wherein the stretching connection portions of the inner-layer elastic metal sheet is arranged to be slidable within the range of the movement allowance relative to the connected component.

5. The multilayer wind spring for a display support according to claim 1, wherein a fastening connector for connecting the stretching connection portion to the connected component is inserted into the semi-restricted structure, and the fastening connector and the semi-restricted structure are provided to have the movement allowance therebetween, wherein the fastening connector does not completely press and lock the stretching connection portion, and the stretching connection portion is arranged to be slidable relative to the fastening connector.

6. The multilayer wind spring for a display support according to claim 1, wherein the semi-restricted structure is an elongated hole, an elongated groove or a round hole structure, and the elongated hole or the elongated groove is arranged such that the length direction thereof is in the unwinding or winding up direction of the elastic metal sheets.

7. The multilayer wind spring for a display support according to claim 1, wherein the movement allowance is 0.3-15 mm.

8. The multilayer wind spring for a display support according to claim 3, wherein an end of the stretching connection portion of each of the elastic metal sheets is bent towards an opposite side of the unmovable wound portion to form a hook used as the semi-restricted structure, and the hook is hooked onto the connected component, the hook of each of the inner-layer elastic metal sheets can move unidirectionally in a stretching direction away from the unmovable wound portion.

9. The multilayer wind spring for a display support according to claim 1, wherein thickness of a $j^{th}$ of the elastic metal sheets is h, and after the movable sheet portion is wholly wound up and wound around an outer side of the unmovable wound portion, the movable sheet portion is wound for m turns, and the movement allowance of the $j^{th}$ metal sheet is 2 $\pi$mh±3 mm, wherein h>0, m>0, 2≤j≤n.

10. The multilayer wind spring for a display support according to claim 1, wherein all the elastic metal sheets of the unmovable wound portion are arranged to be fixed to one another.

11. The multilayer wind spring for a display support according to claim 10, wherein the elastic metal sheets of the unmovable wound portion are fixedly connected by means of rivet, screw, buckle, pin, mortise-tenon structure, bundling, welding, or bonding.

12. A lifting support having the multilayer wind spring for a display support according to claim 1, comprising a stand column and a lifting seat, wherein the lifting seat is disposed on the stand column in a manner of being slidable up and down, the stretching connection portion of the multilayer wind spring is connected to the lifting seat or the stand column, the stretching connection portion of each of the elastic metal sheets provided with the semi-restricted structure is arranged to be slidable within a range of a movement allowance relative to the lifting seat or the stand column, the unmovable wound portion of the multilayer wind spring is rotatably disposed on the stand column or the lifting seat, and the multilayer wind spring tends to force the lifting seat to move upwards, thereby providing a supporting force for supporting the lifting seat.

13. A lifting support having the multilayer wind spring for a display support according to claim 3, comprising a stand column and a lifting seat, wherein the lifting seat is disposed on the stand column in a manner of being slidable up and down, the stretching connection portion of the multilayer wind spring is connected to the lifting seat or the stand column, the stretching connection portion of each of the elastic metal sheets provided with the semi-restricted structure is arranged to be slidable within a range of a movement allowance relative to the lifting seat or the stand column, the unmovable wound portion of the multilayer wind spring is rotatably disposed on the stand column or the lifting seat, and the multilayer wind spring tends to force the lifting seat to move upwards, thereby providing a supporting force for supporting the lifting seat.

* * * * *